United States Patent Office 3,397,048
Patented Aug. 13, 1968

3,397,048
CONTROL OF PLANT LIFE
Harold Lester Lindaberry, Aurora, Ill., assignor to Pennsalt Chemicals Corporation, Philadelphia, Pa., a corporation of Pennsylvania
No Drawing. Filed Apr. 5, 1966, Ser. No. 540,190
5 Claims. (Cl. 71—66)

ABSTRACT OF THE DISCLOSURE

Control of plant life with a synergistic mixture of the anion of 3,6-endoxohydro-orthophthalic acid, and a 1,1′-ethylene-2,2′-dipyridylium dihalide.

---

This invention relates to a novel composition and the control of plant life and deals particularly with a synergistic mixture and its use for chemical control of aquatic and terrestrial weeds. Although this invention is applicable to control of both terrestrial and aquatic weeds, emphasis will be placed on its use for aquatic weed control for which it is particularly suited.

Numerous chemical agents are known to control (i.e., kill or inhibit) plant growth, but each agent has disadvantages which limit its usage. For example, there are many potent aligicides which cannot be used for aquatic plant control because at useful concentrations, they are extremely toxic to fish. On the other hand, some agents may effectively control one species of plant life and be of little or no value in controlling others. Still other agents are known which have limited utility because of their high cost (e.g., silver compounds). Thus, there exists the need for improved means to effectively control the many varieties of undesirable terrestrial weeds and undesirable weeds, fungi, and algae existing in ponds, lakes, streams, etc.

It is known that the disodium salt of endothal (3,6-endoxohexahydrophthalic acid) can be used for aquatic weed control. This compound is quite effective and is relatively non-toxic to fish, but it is somewhat slow in its action. It is, of course, desirable that herbicides act quickly and fast action also aids to avoid loss by chemical degradation as well as diffusion due to water currents and/or weather conditions.

It has now been found in accord with this invention that plant life and preferably aquatic plant life, can be effectively controlled by use, at very low concentrations, of a mixture of the anion of 3,6-endoxohydro-orthophthalic acid, and a 1,1′-ethylene-2,2′-dipyridylium dihalide, preferably the dibromide.

The 3,6-endoxohydro-orthophthalic acid and its alkali metal salts useful in this invention will have less than three double bonds in the endoxocarboxylic acid ring, but may have all three degrees of ring saturation and thus will include 3,6-endoxodihydro-orthophthalic acids, e.g.,

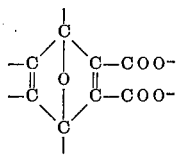

3,6-endoxotetrahydro-orthophthalic acids, e.g.,

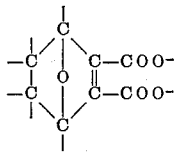

and

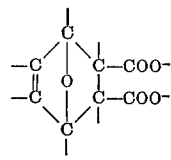

and 3,6-endoxohexahydro-orthophthalic acids, e.g.,

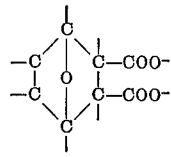

In this group, the latter compounds (i.e., the hexahydro compounds) generally have greater activity and are the preferred anions to be used.

It will be understood that all of the 3,6-endoxohydrophthalic anions may be used in the form of their salts. Preferably the salts used will be those where the cation is an alkali metal, preferably sodium or potassium, or an amine, preferably ammonium or a tertiary amine of structure

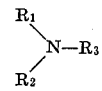

where $R_1$ and $R_2$ are alkyl containing one to six carbon atoms and $R_3$ is alkyl of one to eighteen carbon atoms, preferably a long chain alkyl group of 12 to 18 carbon atoms. Preferred amine salts include those where the amine is N,N-dimethyldodecylamine, N,N-dimethyltridecylamine, and N,N-dimethylcocoamine.

In addition to the unsubstituted acids, monovalent radical substituted derivatives may be used and such substituents will include halogens (e.g., chlorine, bromine, etc.), lower alkyl, lower alkoxy, lower aryl, lower aryloxy, nitro, cyano, haloalkyl (e.g., trifluoromethyl) and like groups. The substituted acids from which the salts useful in this invention are derived are described and their preparation given in U.S. 2,576,080.

The dipyridylium compound used in the synergistic mixture of the invention will be a compound having the formula

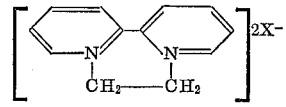

Where $X^-$ is the anion of a halogen acid, e.g., $F^-$, $Cl^-$, $Br^-$, and $I^-$ and is preferably $Cl^-$ and $Br^-$. The dipyridylium compound is generally used as its hydrate since it is readily available in this form.

The mixture of active components will be such that the proportion of each may vary from about 20% to about 80% by weight of the mixture, but the preferred range will be from about 30% to about 60% and a ratio of 50:50 being most preferred. The synergistic effect of this mixture is quite remarkable and this effect is illustrated in the examples.

The synergistic mixture described above acts as a contact poison and for this reason, aquatic weed control is achieved quickly simply by treating the area with sufficient material to maintain a given strength of active ingredient in the water surrounding the exposed tissue surface area of the plant. The activity of the above-described mixture is so high that satisfactory control is obtained with a concentration of less than one part per million of the mixture of active ingredient in solution in the water surrounding the plants. For most applications where an entire area such as a pond or lake is treated, concentrations of about 0.05 to 1.0 p.p.m. will be quite effective with no harm to fish. The preferred concentration range which is harmless to fish will usually be between about 0.25 to 0.5 p.p.m.

The manner in which the water area may be treated will vary with the specific problems encountered. Since the active ingredient is water soluble it will diffuse out from the area treated. However, in this invention this is not serious because of the very fast action of the agents. In treating small areas where the weed problem is usually critical around the edge of the pond it is more practical to treat the marginal area from the bank than to treat from the center. Furthermore, because of the diffusion of the agents toward the center in static water, control will be obtained there also. Aqueous solutions are usually preferred for economic reasons.

Treatment is accomplished best by spraying on the water or by injection just below the water surface with distribution as evenly as possible in the area to be treated. Spraying equipment is preferably used with aqueous solutions and because the agent is applied as an aqueous solution no problem of preparation, operation or cleaning is involved. In general, the diluted treating solution will contain about 1.0% to about 25% by weight of active ingredient. In order to aid in the estimation of the gallonage of a 20% active aqueous solution for various pond sizes, the following table is given:

TABLE I.—APPROXIMATE GALLONS OF 20% ACTIVE AGENT CONCENTRATE NEEDED TO TREAT ONE ACRE OF POND SURFACE (APPROX. 208′ BY 208′)

| Pond depth, feet | For dosage of | |
|---|---|---|
| | 0.5 p.p.m., gallons | 1.0 p.p.m., gallons |
| 1 | 0.65 | 1.3 |
| 2 | 1.3 | 2.6 |
| 3 | 1.95 | 3.9 |
| 4 | 2.6 | 5.2 |
| 5 | 3.25 | 6.5 |
| 6 | 3.9 | 7.8 |

As is evident from the table the concentrations and depths are directly proportional, and other concentrations and depth requirements may be calculated accordingly.

As indicated, the active agents described above are effective in accord with this invention for the control of plant life in aquatic systems and are particularly effective against submersed aquatic weeds. One of the particular advantages of the invention is that it enables a wide variety of plant life to be controlled with a single active ingredient, i.e., the agents have broad spectrum activity. The salts as described above are effective against practically all aquatic plants and growth which cause problems on lakes, ponds, rivers, streams, etc. Thus the invention is useful in controlling Pondweeds (Potamogeton spp.), including Bassweed, Curly Leaf Pondweed, Floating-Leaf Pondweed, Sago Pondweed, Flat-Stem Pondweed, Bushy Pondweed (Naias spp.), Horned Pondweed (Zanichellia sp.) Coontail (Ceratophyllum sp.), Water Milfoil (Myriophyllum spp.), Mud Plantain and Water Stargrass (Heteranthera spp.), Bladderwort (Utricularia spp.), Burr Weed (Sparganium spp.), Tapegrass, Wild Celery, Eelgrass (Vallisneria sp.), Waterweed, Elodea spp.), members of the Duckweed family, such as Big Duckweed (Spriodella sp.), Duckweed (Lemna spp.), Watermeal (Wolffia spp.) (Wolffiella sp.), and the filamentous green algae known as Pond Scum (Cladophora, spirogyra, Pithophora, Thizoclonium, Ulothrix).

In addition to use in ponds and lakes, this invention is applicable to the control of algae in cooling towers and other water recirculating systems as used in paper manufacturing processes for example, in drainage ditches and other water flowing sites.

In order to more fully describe and illustrate the invention, the following examples are given:

Example 1.—Preparation of formulation (A) A formulation is made by mixing 0.66 gal. of the potassium salt of 3,6-endoxo-hexahydro-o-phthalic acid (containing 3 lbs. acid equivalent per gallon) with 1.0 gallon of 1,1′-ethylene-2,2′-dipyridylium bromide containing 2 lbs. per gallon of cation and 0.34 gallon of water was added to give a product containing 2 lbs. per gallon of active ingredient.

(B) A formulation is made by mixing 1 gallon of an aqueous solution containing two pounds of the sodium salt of 3,6-endoxohexahydro-o-phthalic acid with one gallon of an aqueous solution containing two pounds of the cation of 1,1′-ethylene-2,2′-dipyridylium bromide.

Example 2

Tests were conducted in aquaria containing Elodea, sago pondweed, and Cladophora. Various aquaria were treated with the sodium salt of 3,6-endoxohexahydro-orthophthalic acid alone, with the 1,1′-ethylene-2,2′-dipyridylium dibromide alone, and with the synergistic mixture. The following table indicates the results obtained:

TABLE 1

| Agent | Rate (p.p.m.) | Percent Control | | |
|---|---|---|---|---|
| | | Elodea | Sago | Cladophora |
| (A) 3,6-endoxohexahydro-o-phthalic acid salt | 0.05 | 0 | 0 | 0 |
| (B) 1,1′-ethylene-2,2′-dipyridylium dibromide | 0.05 | 30 | 40 | 30 |
| (A) plus (B) | 0.025 / 0.025 | 100 | 100 | 100 |

It is clear from this table that the effect of the mixture is synergistic in nature. In a similar experiment where a mixture of equal amounts of the 3,6-endoxohexahydro-orthophthalic acid salt and the 1,1′ - ethylene-2,2′-dipyridylium dibromide was used at 0.05 p.p.m. each, essentially complete control of the weeds was also obtained. Complete control in the above tests occurred in no more than six days at the concentrations indicated.

Example 3

A one-quarter acre plot of a large lake was treated at 0.5 p.p.m. with a synergistic mixture containing 50% endothall as the potassium salt and 50% 1,1'-ethylene-2,2'-dipyridylium dibromide. In this test excellent control of fine leaf pondweed and sago pondweed was obtained, and Elodea was severely burned back.

Example 4

In a test similar to that of Example 3, treating a one-acre pond 7 feet deep with 0.125 p.p.m. of a 50% endothall as the potassium salt and 50% 1,1'-ethylene-2,2'-dipyridylium dibromide in a single application, the lake was kept free of pondweed and algae from early July through the entire summer.

Example 5

Using a mixture of 50% endothall as the potassium salt, and 50% 1,1'-ethylene-2,2'-dipyridylium dibromide 100% control of Najas, Elodea and coontail was obtained at 0.5 p.p.m. Under similar conditions and at the same concentration with either 3,6-endoxohexahydro-orthophthalic acid or its sodium salt alone, or with 1,1'-ethylene-2,2'-dipyridylium dibromide alone, no control of Elodea is obtained.

Example 6

TABLE II

| Agent | Rate, p.p.m. | Percent control of Elodea | |
|---|---|---|---|
| | | 2 wks. | 4 wks. |
| (A) Potassium salt of 3,6-endoxohexahydro-o-phthalic acid | 0.5 | 0 | 0 |
| (B) 1,1'-ethylene-2,2'-di-pyridylium dibromide | 0.5 | 38 | 55 |
| (A) plus (B) | 0.25 0.25 | 98 | 100 |

Example 7

In a test on Elodea with the formulation of the invention at various ratios of active ingredients, excellent control was obtained. The data is shown in the following Table III.

TABLE III

| Agent | Concentration, p.p.m. | Percent Control |
|---|---|---|
| PE [1] | 0.50 | [3] |
| D [2] | 0.25 | [3] |
| PE plus D | 0.125 0.125 | 100 |
| PE plus D | 0.34 0.16 | 100 |
| PE plus D | 0.16 | 100 |
| PE plus D | 0.375 0.125 | 100 |
| PE plus D | 0.125 0.375 | 100 |
| PE plus D | 0.25 0.25 | 100 |
| PE plus D | 0.1 0.4 | 100 |
| PE plus D | 0.4 0.1 | 100 |

[1] PE is potassium endothall.
[2] D is 1,1'-ethylene-2,2'-dipyridylium dibromide.
[3] None.

Example 8

In an evaluation on the terrestrial weeds, crabgrass and lambsquarter, the following data and results were observed:

TABLE IV

| Agent | Rate Lbs./Acre | Crabgrass | Lambsquarter |
|---|---|---|---|
| PE [1] | 2.5 | 5 | 3 |
| D [2] | 0.25 | 45 | 70 |
| D [2] | 0.50 | 50 | 80 |
| PE plus D | 0.25 0.25 | 70 | 90 |
| PE plus D | 0.5 0.5 | 70 | 100 |

[1] Potassium salt of endothall.
[2] 1,1'-ethylene-2,2'-dipyridylium bromide.

It is evident from the above table that potassium endothal alone is not effective as a herbicide against crabgrass and lambsquarter, nor is 1,1'-ethylene-2,2'-dipyridylium bromide alone very effective. However, on using a mixture of the two agents, the herbicidal effect is improved beyond any expected additive effect, thus indicating the synergism of the mixture.

I claim:

1. A synergistic mixture for the control of plant life comprising a plant life inhibiting amount of the alkali metal, alkaline earth metal, or amine salt of a 3,6-endoxo-orthophthalic acid and a 1,1'-ethylene-2,2'-dipyridylium dihalide wherein the active agents are present in a weight ratio of from about 20 to 80 to about 80 to 20.

2. A mixture as in claim 1 where the active agents are 1,1'-ethylene-2,2'-dipyridylium dibromide and the potassium salt of 3,6-endoxohexahydro-orthophthalic acid.

3. A mixture as in claim 2 where the weight ratio of the active agent is approximately 50:50.

4. A process to inhibit plant life which comprises contacting said plant life with an inhibiting amount of a mixture comprising in a weight ratio of from about 20 to 80 to about 80 to 20 an alkali metal, alkaline earth metal, or amine salt of a 3,6-endoxo-orthophthalic acid and a 1,1'-ethylene-2,2'-dipyridylium dihalide.

5. The process of claim 4 applied to aquatic plants where the active agents are potassium 3,6-endoxohexahydroorthophthalic acid and 1,1'-ethylene-2,2'-dipyridylium dibromide.

References Cited

UNITED STATES PATENTS

| 2,576,080 | 11/1951 | Tischler | 71—75 |
| 2,823,987 | 2/1958 | Fielden | 71—92 |

JAMES O. THOMAS, JR., *Primary Examiner.*